(12) United States Patent
Dean et al.

(10) Patent No.: US 11,562,573 B2
(45) Date of Patent: Jan. 24, 2023

(54) PHRASE RECOGNITION MODEL FOR AUTONOMOUS VEHICLES

(71) Applicant: WAYMO LLC, Mountain View, CA (US)

(72) Inventors: Victoria Dean, Palo Alto, CA (US); Abhijit S Ogale, Sunnyvale, CA (US); Henrik Kretzschmar, Mountain View, CA (US); David Harrison Silver, San Carlos, CA (US); Carl Kershaw, San Francisco, CA (US); Pankaj Chaudhari, Mountain View, CA (US); Chen Wu, Cupertino, CA (US); Congcong Li, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 217 days.

(21) Appl. No.: 17/123,185

(22) Filed: Dec. 16, 2020

(65) Prior Publication Data

US 2021/0192238 A1 Jun. 24, 2021

Related U.S. Application Data

(63) Continuation of application No. 16/879,299, filed on May 20, 2020, now Pat. No. 10,902,272, which is a (Continued)

(51) Int. Cl.
*G06V 20/58* (2022.01)
*G05D 1/00* (2006.01)
(Continued)

(52) U.S. Cl.
CPC ......... *G06V 20/582* (2022.01); *G05D 1/0088* (2013.01); *G06F 40/30* (2020.01);
(Continued)

(58) Field of Classification Search
CPC .... G06V 20/582; G06V 30/153; G06V 30/10; G06V 20/63; G06V 30/19133;
(Continued)

(56) References Cited

U.S. PATENT DOCUMENTS 9,760,090 B2 9/2017 Shashua et al.
2014/0012582 A1* 1/2014 Ganong, III ............ G10L 15/18
704/E15.001

(Continued)

FOREIGN PATENT DOCUMENTS

DE 102016011271 A1 4/2017
KR 10-2017-0087647 A 7/2017
(Continued)

OTHER PUBLICATIONS

"International Search Report and Written Opinion for application No. PCT/US2019/038953 dated Oct. 11, 2019", 11 pages.
(Continued)

*Primary Examiner* — Juan A Torres
(74) *Attorney, Agent, or Firm* — Botos Churchill IP Law

(57) ABSTRACT

Aspects of the disclosure relate to training and using a phrase recognition model to identify phrases in images. As an example, a selected phrase list may include a plurality of phrases is received. Each phrase of the plurality of phrases includes text. An initial plurality of images may be received. A training image set may be selected from the initial plurality of images by identifying the phrase-containing images that include one or more phrases from the selected phrase list. Each given phrase-containing image of the training image set may be labeled with information identifying the one or more phrases from the selected phrase list included in the given phrase-containing images. The model may be trained based on the training image set such that the model is configured to, in response to receiving an input
(Continued)

image, output data indicating whether a phrase of the plurality of phrases is included in the input image.

20 Claims, 10 Drawing Sheets

Related U.S. Application Data continuation of application No. 16/018,490, filed on Jun. 26, 2018, now Pat. No. 10,699,141.

(51) Int. Cl.
| | |
|---|---|
| *G06N 3/08* | (2006.01) |
| *G06T 11/20* | (2006.01) |
| *G06F 40/30* | (2020.01) |
| *G06V 30/148* | (2022.01) |
| *G06V 30/10* | (2022.01) |

(52) U.S. Cl.
CPC ............... *G06N 3/08* (2013.01); *G06T 11/20* (2013.01); *G06V 30/153* (2022.01); *G05D 2201/0213* (2013.01); *G06T 2210/12* (2013.01); *G06V 30/10* (2022.01)

(58) Field of Classification Search
CPC ......... G06V 30/19147; G06V 30/1916; G05D 1/0088; G05D 2201/0213; G06F 40/30; G06F 40/20; G06N 3/08; G06N 5/02; G06N 5/046; G06N 3/084; G06N 5/003; G06N 20/20; G06T 11/20; G06T 2210/12
USPC ........................................................ 382/104
See application file for complete search history.

(56) References Cited

U.S. PATENT DOCUMENTS

| | | |
|---|---|---|
| 2014/0119605 A1 | 5/2014 | Zobel |
| 2016/0001781 A1 | 1/2016 | Fung et al. |
| 2016/0139594 A1 | 5/2016 | Okumura et al. |
| 2016/0144867 A1 | 5/2016 | Delp et al. |
| 2016/0176341 A1 | 6/2016 | Raghu et al. |
| 2017/0004374 A1 | 1/2017 | Osindero |
| 2017/0017849 A1 | 1/2017 | Kristensen |
| 2017/0161569 A1 | 6/2017 | Ren et al. |
| 2017/0206465 A1 | 7/2017 | Jin et al. |
| 2017/0206887 A1 | 7/2017 | Wilbert et al. |
| 2018/0120857 A1 | 5/2018 | Kappauf et al. |
| 2019/0303693 A1 | 10/2019 | Watanabe |

FOREIGN PATENT DOCUMENTS

| | | |
|---|---|---|
| KR | 20170087647 A | 7/2017 |
| KR | 10-2018-0031174 A | 3/2018 |
| KR | 20180031174 A | 3/2018 |

OTHER PUBLICATIONS

Greenhalgh, et al., "Recognizing text-based traffic signs", IEEE Trans. Intell. Transp. Syst, vol. 16, No. 3, Jun. 2015, pp. 1360-1369.
Islam, et al., "Real-Time (Vision-Based) Road Sign Recognition Using an Artificial Neural Network", MDPI journals Sensors, vol. 17, No. 4, Available at <:https://www.mdpi.com/191556>, See section 2 of p. 3, section 4.5 of p. 21 and figures 2, 10, 13-14, 2017, pp. 1-32.
Lorsakul, et al., "Traffic Sign Recognition for Intelligent Vehicle/ Driver Assistance System Using Neural Network on OpenCV", The 4th Intern. Conf. on Ubiquitous Robots and Amb. Intell. (URAI 2007), Available at <https://www.researchgate.net/publication/ 228522786>, 2007, 6 pages.
Mammeri, et al., "Road-Sign Text Recognition Architecture for Intelligent Transportation Systems", In Proceedings of the 2014 IEEE 80th Vehicular Technology Conference (Vtc Fall), Vancouver, BC, Canada,, Sep. 14-17, 2014, 5 pages.
The Partial Supplementary European Search Report for European Patent Application No. 19826014.3, dated Jan. 5, 2022.
Wenzel, et al., "Towards Unconstrained Content Recognition of Additional Traffic Signs," IEEE Intelligent Vehicles Symposium (IV), 2017, pp. 1421-1427.
The Extended European Search Report for European Patent Application No. 19826014.3, dated May 19, 2022.

\* cited by examiner

PHRASE RECOGNITION MODEL FOR AUTONOMOUS VEHICLES

CROSS REFERENCE TO RELATED APPLICATIONS

The present application is a continuation of U.S. patent application Ser. No. 16/879,299, filed May 20, 2020, which application is a continuation of U.S. patent application Ser. No. 16/018,490, filed Jun. 26, 2018, the entire disclosures of which are incorporated by reference herein BACKGROUND Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using cameras, radar, LIDAR sensors, and other similar devices. The perception system executes numerous decisions while the autonomous vehicle is in motion, such as whether to speed up, slow down, stop, or turn. Autonomous vehicles may also use the cameras, sensors, and global positioning devices to gather and interpret images and sensor data about its surrounding environment, e.g., parked cars, trees, buildings, etc.

BRIEF SUMMARY

One aspect of the disclosure provides a method of training a phrase recognition model for identifying phrases in images. The method includes receiving, by one or more server computing devices, a selected phrase list including a plurality of phrases wherein each phrase of the plurality of phrases includes text; receiving, by the one or more server computing devices, an initial plurality of images; selecting, by the one or more server computing devices, a training image set from the initial plurality of images by identifying the phrase-containing images that include one or more phrases from the selected phrase list, wherein each given phrase-containing image is labeled with information identifying the one or more phrases from the selected phrase list included in the given phrase-containing image; and training, by the one or more server computing devices, the phrase recognition model using the training image set such that the phrase recognition model is configured to, in response to receiving an input image, output data indicating whether a phrase of the plurality of phrases is included in the input image.

In one example, training the phrase recognition model is further based on contextual information included in the training image set, the contextual information corresponding to edges of objects within images of the training image set. In another example, selecting the training image set includes including one or more images from the initial plurality of images that do not include any phrase from the selected phrase list in the training image set. In another example, the phrase recognition model is further configured to output a confidence score for the output data. In another example, at least some of the text of the plurality of phrases includes one or more words providing rules a vehicle should follow when maneuvering on a roadway. In another example, the output data further identifies the phrase of the plurality of phrases included in the input image. In another example, at least some of the text of the plurality of phrases includes phrases providing rules a vehicle should follow when maneuvering on a roadway. In another example, the phrase recognition model is trained such that the phrase recognition model is configured to provide the output data without a character by character recognition analysis of the input image. In another example, the training is performed using a neural network that provides model parameter values for the phrase recognition model. In another example, the method also includes sending the phrase recognition model to a vehicle having an autonomous driving mode in order to enable one or more computing devices of the vehicle to use the phrase recognition model to make driving decisions for the vehicle.

Another aspect of the disclosure provides a method for controlling a vehicle having an autonomous driving mode. The method includes receiving, by one or more computing devices of the vehicle, an image of an external environment of the vehicle; processing, by the one or more computing devices, the image using a phrase recognition model in order to identify text in the image that is included in a selected phrase list; identifying, by the one or more computing devices, a semantic meaning for the identified text; and controlling, by the one or more computing devices, the vehicle in the autonomous driving mode based on the identified semantic meaning.

In one example, the phrase recognition model is configured to only recognize text that is included in the selected phrase list. In another example, the method also includes, before controlling the vehicle, validating the phrase recognition model using a character by character recognition analysis approach, and wherein controlling the vehicle is further based on the validation. In another example, using the phrase recognition model includes inputting the image into the phrase recognition model and receiving output data, and the output data includes a list of one or more entries, each entry corresponding to a phrase of the selected phrase list and identifying a confidence score of that phrase being included in the image. In another example, using the phrase recognition model includes inputting the image into the phrase recognition model and receiving output data, and the output data includes a bounding box identifying text and a list of one or more entries, each entry corresponding to a phrase of the selected phrase list and identifying a confidence score of that phrase being included in the bounding box. In another example, processing the image using a pattern recognition model in order to determine whether a particular pattern having a second semantic meaning is included in the image, determining whether the second semantic meaning matches the semantic meaning, and the determination of whether the second semantic meaning matches the semantic meaning is further used to control the vehicle. In this example, flagging the image for further processing when the second semantic meaning does not match the semantic meaning. In addition or alternatively, the method also includes sending a request for assistance to a remote computing device including the image. In another example, the method also includes processing the image using the phrase recognition model in order to determine a location of the text on the image, processing the image using a pattern recognition model in order to determine contextual information based on the location of the text, and the determined contextual information is further used to control the vehicle. In another example, the method also includes determining that the text is part of an unrecognized phrase, determining using a character by character recognition approach at least part of the unrecognized phrase, and the determined at least part of the unrecognized phrase is further used to control the vehicle.

DETAILED DESCRIPTION

Overview

Figure 1:
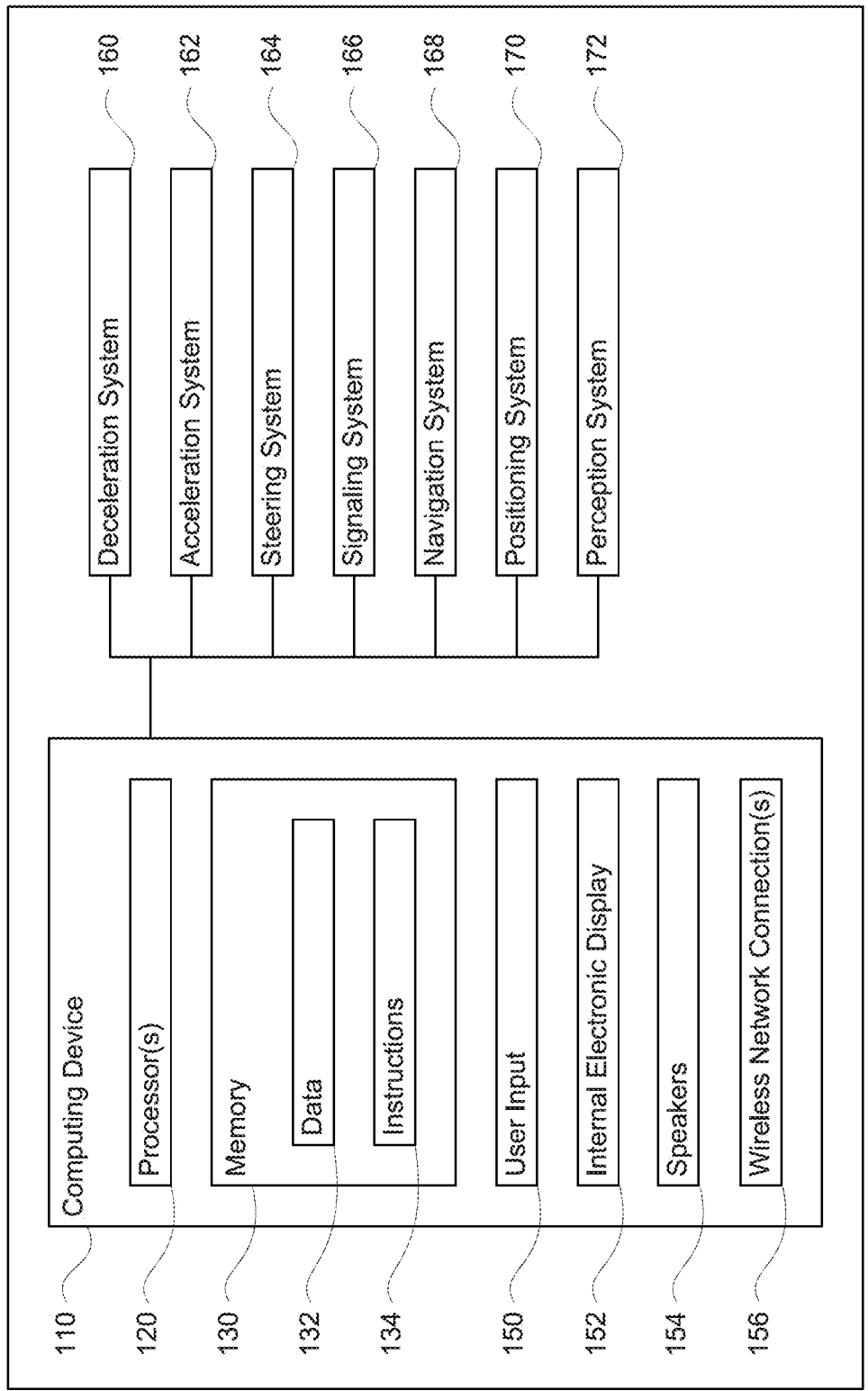
FIG. 1 is a functional diagram of an example vehicle in accordance with an exemplary embodiment.

The technology generally relates to an efficient detection and analysis of text and phrases, such as those presented on road signs or vehicles such as school busses or police cars. This is especially important for autonomous and semi-autonomous vehicles that may need to accurately and quickly detect road conditions and rules in order to drive safely. Although certain road conditions and rules represented by construction objects or road signs may be detected by recognizing well-established colored shapes, such as orange triangles (traffic cones), red octagons (stop signs), red triangles (yield sign), or large yellow vehicles (school bus), others may require recognizing textual information. For instance, construction signs, pedestrian signs, and signs indicating hazards or other emergent conditions may not have well-established shapes or colors, or may vary depending on locality. For example, a stop sign might have its shape changed due to damage, a school bus might be white, or a handmade construction sign might have an arbitrary shape or color. For signs that include textual information, such as speed limits, parking restrictions, or rerouting instructions, it may be critical for the vehicle's computing devices to recognize the textual information on the sign.

A typical approach for recognizing text may include using character by character recognition, such as optical character recognition (OCR), and subsequent semantic analysis. However, such methods are computationally intensive and may take as long as several seconds to process all text in a single image. As such, these approaches may not be appropriate for an autonomous vehicle's computing devices which must use such information in real time to make driving decisions, where processing delays of even a few tenths of a second may cause such approaches to be impractical. Further, character-by-character recognition methods scale linearly with the number of characters, which makes such methods impractical for recognizing signs with long words or phrases. Another issue with OCR on long words or phrases may be spellchecking. If each character is independently recognized, there is a high probability that one character will be wrong, and then spell correcting would be needed which, in turn, may require more processing power and time.

In order to address these concerns, a phrase recognition model may be trained using a manually selected phrase list. For instance, a pre-selected phrase list may include items such as collections of words, phrases, numbers and/or other text that are of special interest for making driving decisions. This phrase list may be identified, at least initially, manually by an operator in order to focus on text which is most important for an autonomous vehicle to be able to make intelligent and safe driving decisions.

In addition, for each item of the phrase list, the operator may also identify a semantic meaning for that item. This semantic meaning may be critical to allowing the vehicle to not only identify an item of the phrase list but also to respond to that item without requiring further analysis of the context, etc.

In order to select a training image set, an initial plurality of images may be received, retrieved, or otherwise identified. The initial plurality of images may include images captured by a perception system of an autonomous vehicle in order to provide the most relevant context and orientation of signs that may appear in those images.

From this initial plurality of images, a training image set may be selected by identifying images that include one or more phrases from the selected phrase list. In order to do so, the initial set of images may be processed to identify those images which include text and then further processed to identify the images which include text using known character by character recognition approaches. These processed images may then be analyzed to identify images that contain one or more phrases from the selected phrase list in order to produce the training image set.

The training image set may then be used to train a phrase recognition model that, in response to receiving an input image, will output data including a prediction indicating whether and where a phrase of the plurality of phrases is present in the input image as well as one or more confidence scores for that indication.

The phrase recognition model as well as information identifying relationships between the items of the phrase list and the semantic meanings may be sent to and stored locally on a vehicle in order to allow the computing devices of that vehicle to determine whether an image captured by a camera of the vehicle contains any phrase from the selected phrase list. For example, the one or more computing devices of a vehicle may use the phrase recognition model to determine that an image captured by the vehicle contains one or more phrases of the selected phrase list.

This confidence score may then be compared to a threshold value to determine whether the vehicle should respond to the semantic meaning of the identified phrase. If that confidence meets or is greater than a threshold value, the vehicle's computing device may identify the semantic meaning from the information identifying relationships between the items of the phrase list and the semantic meanings. The vehicle's computing devices may then control the vehicle in order to react to the identified semantic meaning.

This may allow the vehicle's computing device to make such determinations on the order of tens of milliseconds as opposed to as much as several seconds. This way, the phrase recognition model may be able to process images from multiple cameras located at different positions on the vehicle. This may thus allow the vehicle's computing device to make driving decisions based on such determinations in real time.

One or more additional image recognition models may be used to validate and/or augment the phrase recognition model. To validate the phrase recognition model, a pattern recognition model may be used to determine that the image contains one or more particular pattern, where each particular pattern is associated with a semantic meaning. The semantic meaning of a particular pattern detected using the pattern recognition model may be compared with the semantic meaning of the particular phrase detected using the phrase recognition model. If the two meanings match, then the phrase recognition model may be validated by the pattern recognition model, or vice versa. Thus, the confidence in the semantic meaning identified for the phase determined using the phrase recognition model and/or the semantic meaning identified for the particular pattern determined using the phrase recognition model may be increased and can be used to control the vehicle in the autonomous driving mode. When the two meanings do not match, then the example can be mined for further labeling or training efforts.

A character recognition model may also be used to augment the phrase recognition model. For instance, a vehicle's computing devices may determine based on the phrase recognition model that the particular phrase is part of an unrecognized phrase, and then use a character recognition model to determine the rest of the unrecognized phrase. The results may then be used to control the vehicle accordingly in the autonomous driving mode. Since the more computationally intensive character recognition model is only used to determine the characters next to the particular phrase (instead of the entire image), this process may still allow the vehicle to make timely driving decisions.

The features described herein may provide for an efficient onboard phrase recognition model. First, training the phrase recognition model offline and loading the model onto the vehicle makes it possible to use a very large number of training images to achieve a model with desired high accuracy faster than if done on the vehicle. Second, the phrase recognition model, which detects an entire phrase, which could include one or more words or numbers, is more efficient than a character-by-character analysis. These features therefore reduce the required processing power of onboard computing devices, which may reduce the overall cost of the vehicle and energy consumption while at the same time enabling detection of road conditions and rules with lower latency, for example on the scale of tens of milliseconds, which also improve the overall safety of the vehicle. The technology further provides for use of the phrase recognition model in conjunction with other onboard image recognition models, such as a pattern recognition model or a character recognition model, which may further provide confirmation of determinations by other models, additional information, as well as improved safety without a great sacrifice of processing time.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle in order to control the vehicle in an autonomous driving mode. For example, returning to FIG. 1, computing device 110 may be in communication with various systems of vehicle 100, such as deceleration system 160, acceleration system 162, steering system 164, signaling system 166, navigation system 168, positioning system 170, and perception system 172 in order to control the movement, speed, etc. of vehicle 100 in accordance with the instructions 134 of memory 130 in the autonomous driving mode. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information. As discussed further below, these pull over spots may be "hand" selected or identified areas where at which the vehicle is lawfully able to stop and park for some period of time such as shoulder areas, parking spots, parking lots, emergency pull over spots, etc.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. The vehicle may include a laser or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by supplying fuel or other energy to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 2:
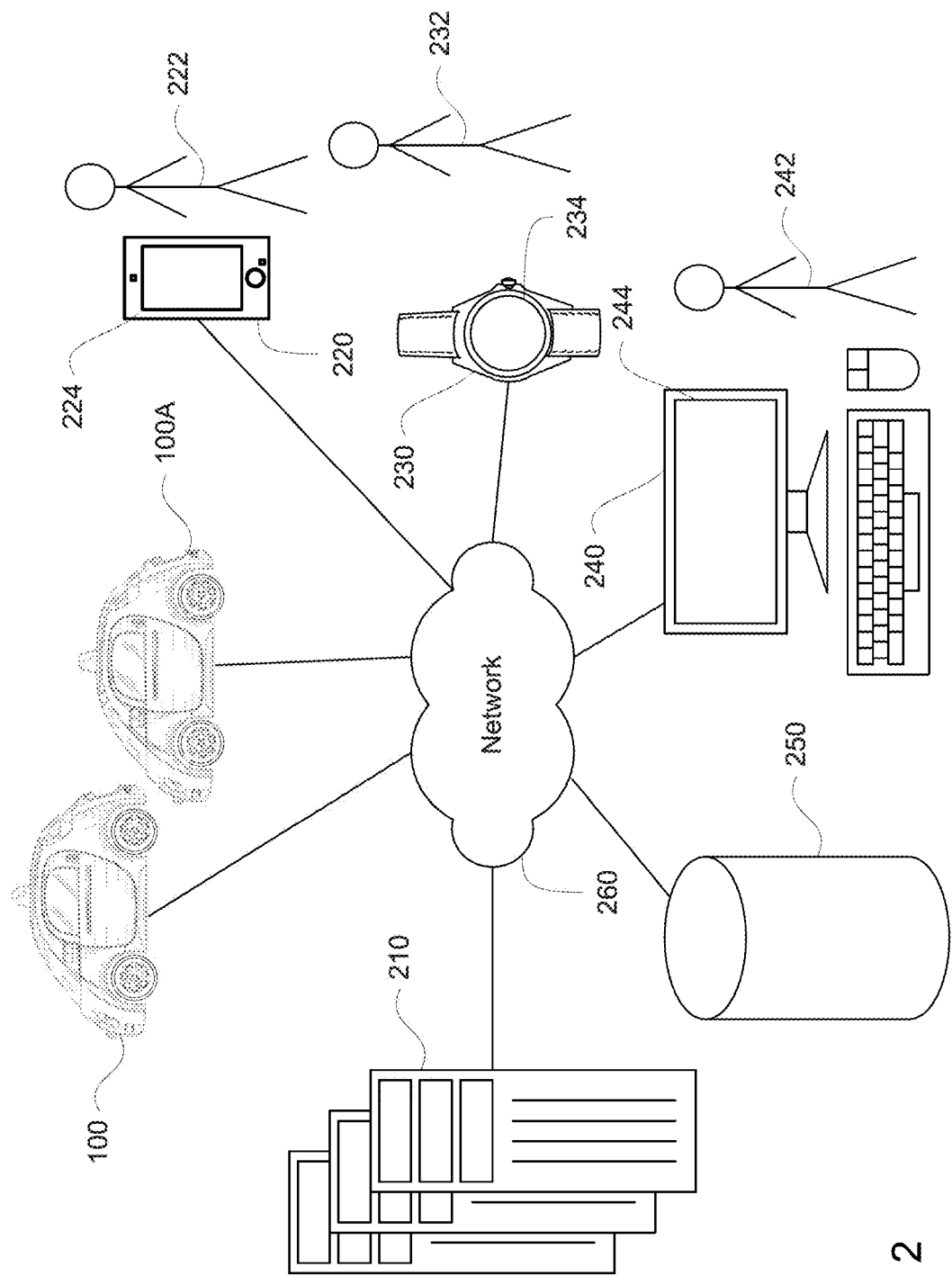
FIG. 2 is a functional diagram of an example system in accordance with aspects of the disclosure.
Figure 3:
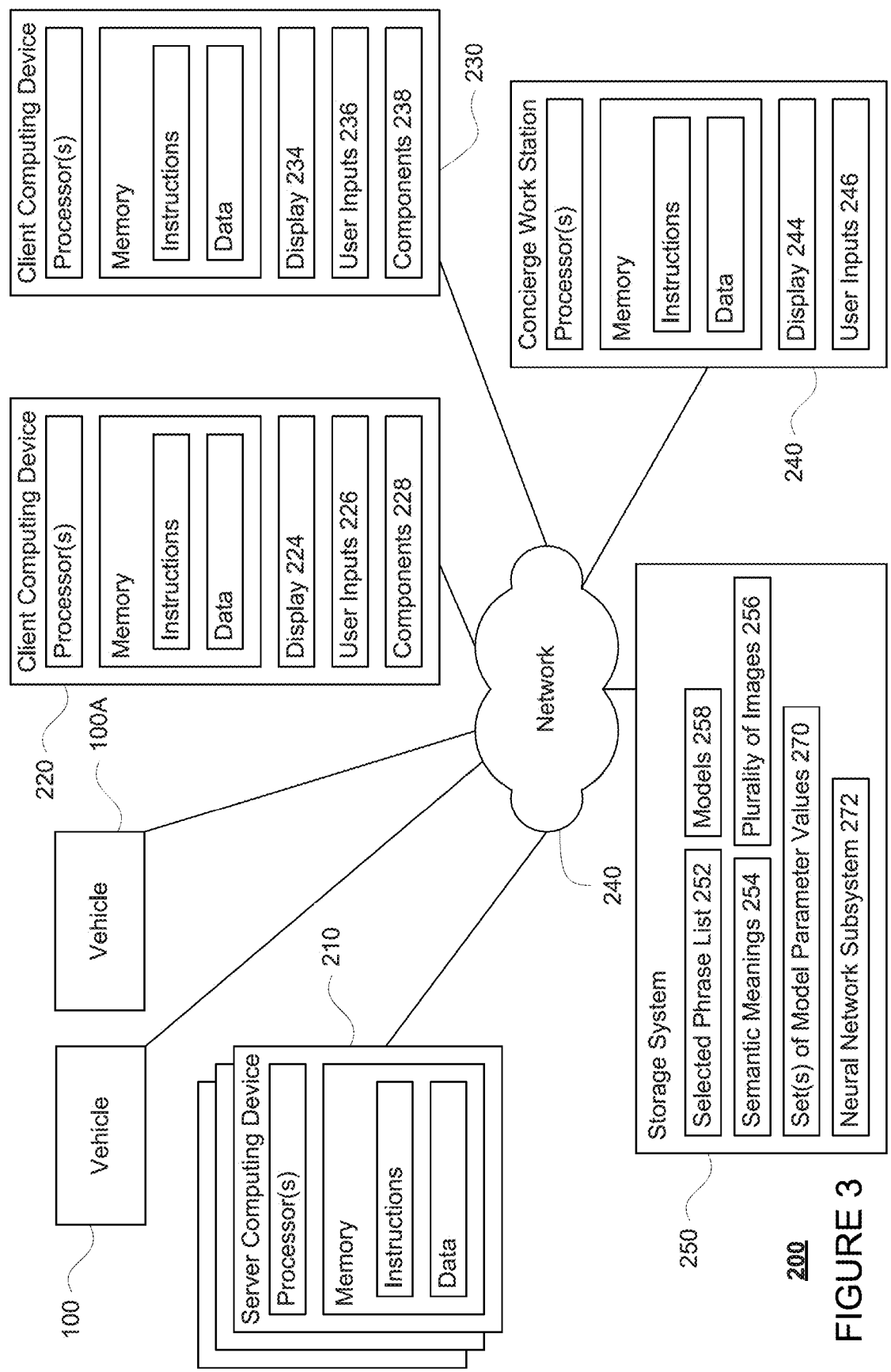
FIG. 3 is a pictorial diagram of the system of FIG. 2 in accordance with aspects of the disclosure.

Computing device 110 of vehicle 100 may also receive or transfer information to and from other computing devices. FIGS. 2 and 3 are pictorial and functional diagrams, respectively, of an example system 200 that includes a plurality of computing devices 210, 220, 230, 240 and a storage system 250 connected via a network 260. System 200 also includes vehicle 100, and vehicle 100A which may be configured similarly to vehicle 100. Although only a few vehicles and computing devices are depicted for simplicity, a typical system may include significantly more.

As shown in FIG. 3, each of computing devices 210, 220, 230, 240 may include one or more processors, memory, data and instructions. Such processors, memories, data and instructions may be configured similarly to one or more processors 120, memory 130, data 132, and instructions 134 of computing device 110.

The network 260, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 210 may include one or more server computing devices that are capable of communicating with computing device 110 of vehicle 100 or a similar computing device of vehicle 100A as well as computing devices 220, 230, 240 via the network 260. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 210 may use network 260 to transmit and present information to a user, such as user 222, 232, 242 on a display, such as displays 224, 234, 244 of computing devices 220, 230, 240. In this regard, computing devices 220, 230, 240 may be considered client computing devices.

As shown in FIG. 3, each client computing device 220, 230, 240 may be a personal computing device intended for use by a user 222, 232, 242, and have all of the components normally used in connection with a personal computing device including a one or more processors (e.g., a central processing unit (CPU)), memory (e.g., RAM and internal hard drives) storing data and instructions, a display such as displays 224, 234, 244 (e.g., a monitor having a screen, a touch-screen, a projector, a television, or other device that is operable to display information), and user input devices 226, 236, 246 (e.g., a mouse, keyboard, touchscreen or microphone). The client computing devices may also include a camera for recording video streams, speakers, a network interface device, and all of the components used for connecting these elements to one another.

In addition, the client computing devices 220 and 230 may also include components 228 and 238 for determining the position and orientation of client computing devices. For example, these components may include a GPS receiver to determine the device's latitude, longitude and/or altitude as well as an accelerometer, gyroscope or another direction/speed detection device as described above with regard to positioning system 170 of vehicle 100.

Although the client computing devices 220, 230, and 240 may each comprise a full-sized personal computing device, they may alternatively comprise mobile computing devices capable of wirelessly exchanging data with a server over a network such as the Internet. By way of example only, client computing device 220 may be a mobile phone or a device such as a wireless-enabled PDA, a tablet PC, a wearable computing device or system, or a netbook that is capable of obtaining information via the Internet or other networks. In another example, client computing device 230 may be a wearable computing system, shown as a wrist watch in FIG. 2. As an example the user may input information using a small keyboard, a keypad, microphone, using visual signals with a camera, or a touch screen.

In some examples, client computing device 240 may be a concierge work station used by an administrator to provide concierge services to users such as users 222 and 232 as well as responses to requests for assistance from vehicles 100 and 100A as needed. For example, a concierge 242 may use the concierge work station 240 to communicate via a telephone call or audio connection with users through their respective client computing devices or vehicles 100 or 100A in order to facilitate the safe operation of vehicles 100 and 100A and the safety of the users as described in further detail below.

Although only a single concierge work station 240 is shown in FIGS. 2 and 3, any number of such work stations may be included in a typical system.

Storage system 250 may store various types of information as described in more detail below. This information may be retrieved or otherwise accessed by a server computing device, such as one or more server computing devices 210, in order to perform some or all of the features described herein. For instance, the storage system may store a selected phrase list 252 as well as semantic meanings 254 for phrases of the selected phrase list. This pre-selected phrase list may include items such as collections of words, phrases, numbers and/or other text that are of special interest for making driving decisions. This selected phrase list may be identified, at least initially, manually by an operator in order to focus on text which is most important for an autonomous vehicle to be able to make intelligent and safe driving decisions. As such, the selected phrase list may include words and phrases related to rules for controlling a vehicle or, in other words, rules which a vehicle should follow in order to maneuver safely and lawfully on a roadway. Thus, the selected phrase list may include words or phrases related to construction (such as "construction," "detour," "zone," "do not enter"), emergency vehicles (such as "ambulance," "fire," "police"), schools (such as "school," "bus," "district," "zone"), general road rules (such as "slow", "stop," "left," "lane," "end," "slow," "U turn"), numbers that are likely to be speed limits (such as "25," "45," "55"), or other useful terms such as "do not enter", "school bus", "wrong way", "no passing", "no parking", "fire lane", etc.

In addition, for each phrase of the phrase list, the operator may also identify a semantic meaning, or an indication of what to do for or how to respond to, that phrase. This semantic meaning may be critical to allowing the vehicle to not only identify an item of the phrase list but also to respond to that item without requiring further analysis of the context in every situation. The relationships between the items of the phrase list and the semantic meanings may be stored in various ways, such as in a table, database, etc.

The storage system 250 may also store a plurality of images 256. This plurality of images may include images captured by a perception system of an autonomous vehicle in order to provide the most relevant context and orientation of signs that may appear in those images. For instance, the plurality of images may be images or frames captured by still and/or video cameras mounted on one or more vehicles such as vehicles 100 or 100A and uploaded via network 260 or otherwise sent to the storage system 250 for storage. Thus, the images may accurately reflect perception of the road and various objects from the perspective of the cameras or perception system of the vehicle. At least some of these images may be associated with OCR data as well as labels as discussed further below.

The storage system 250 as well as data 132 of vehicle 100 may store one or more models 258 as well as model parameter values 270 for each such model. For instance, the storage system may store a phrase recognition model, a pattern recognition model, and an optical character recognition model. In addition, the storage system 250 may include a neural network subsystem 272 that can be used to train the phrase recognition model as discussed further below.

As with memory 130, storage system 250 can be of any type of computer storage capable of storing information accessible by the server computing devices 210, such as a hard-drive, memory card, ROM, RAM, DVD, CD-ROM, write-capable, and read-only memories. In addition, storage system 250 may include a distributed storage system where data is stored on a plurality of different storage devices which may be physically located at the same or different geographic locations. Storage system 250 may be connected to the computing devices via the network 260 as shown in FIG. 2 and/or may be directly connected to or incorporated into any of the computing devices 110, 210, 220, 230, 240, etc.

Figure 4:
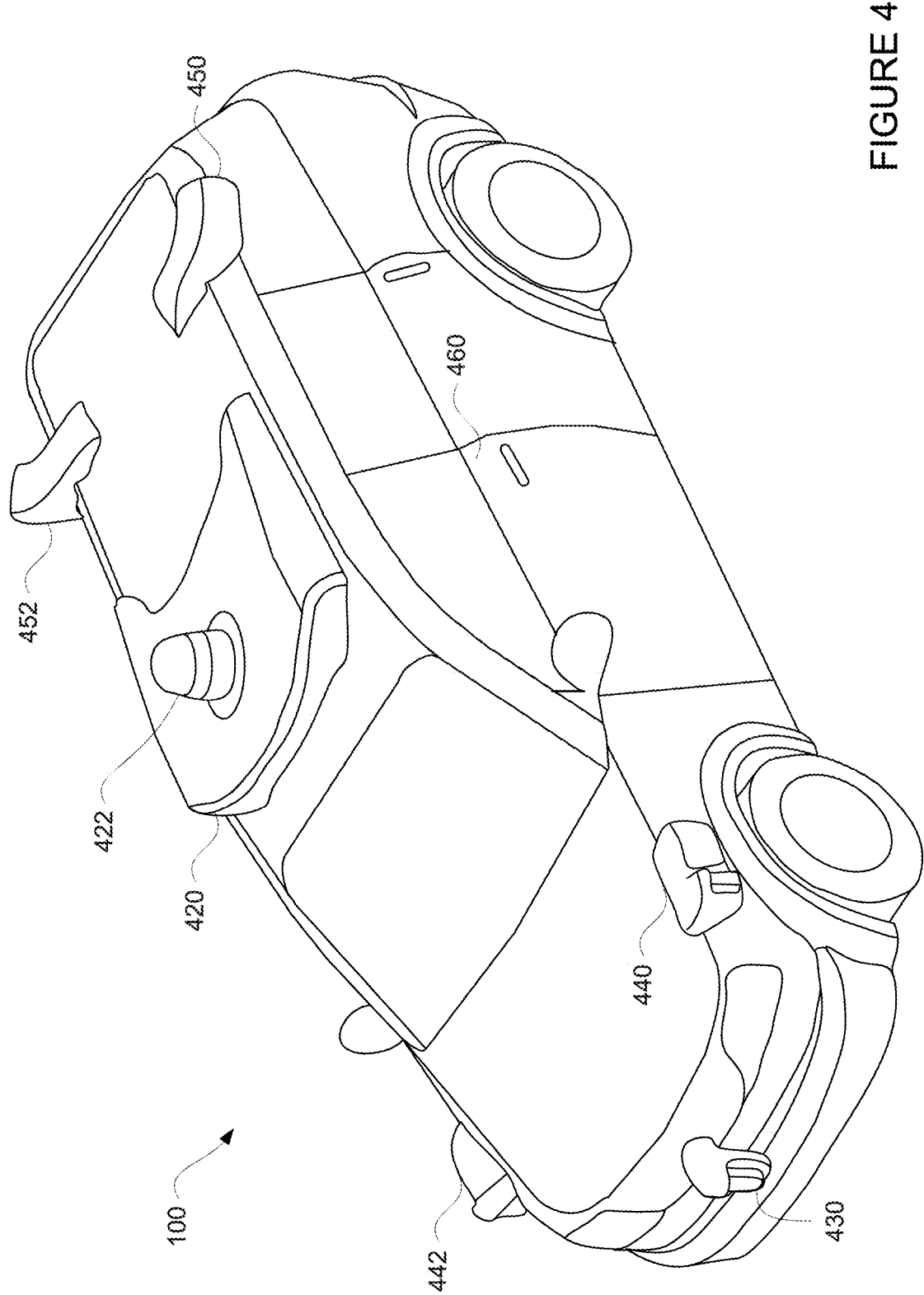
FIG. 4 is an example external view of a vehicle in accordance with aspects of the disclosure.

Vehicle 100 also includes sensors of the perception system 172. FIG. 4 is an example configuration for vehicle 100. In this example, roof-top housing 420 and dome housing 422 may include a LIDAR sensor as well as various cameras and radar units. In addition, housing 430 located at the front end of vehicle 100 and housings 440, 442 on the driver's and passenger's sides of the vehicle may each store a LIDAR sensor. For example, housing 440 is located in front of driver door 460. Vehicle 100 also includes housings 450, 452 for radar units and/or cameras also located on the roof of vehicle 100. Additional radar units and cameras (not shown) may be located at the front and rear ends of vehicle 100 and/or on other positions along the roof or roof-top housing 420. Each of these radar, camera, and laser sensors or devices may be associated with processing components which process data from these devices as part of the perception system 172 and provide sensor data to the computing device 110.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to be able to use the phrase recognition model to identify phrases and make driving decisions, the phrase recognition model may first be trained "offline" that is, ahead of time and/or at a remote computing device and thereafter sent to the vehicle 100 via network 260 and wireless network connections 156. For instance, one or more of server computing devices 210 may generate the phrase recognition model by first selecting a training image set.

In order to select a training image set, an initial plurality of images may be received, retrieved or otherwise identified. For instance, the server computing devices may retrieve images of the plurality of images 256 of storage system 250. As noted above, the initial plurality of images may include images captured by the cameras of the perception system 172 of vehicle 100 in order to provide the most relevant context and orientation of signs that may appear in those images.

From this initial plurality of images, a training image set may be selected by identifying images that include one or more phrases from the selected phrase list. In order to do so, the initial set of images may be processed by the one or more server computing devices 210 in a multi-step process. First, an image may be processed in order to identify which images include text, and for those images that include text, the locations, shapes and sizes (dimensions) of one or more bounding boxes or polygons identifying areas within the image that include the text as well as a confidence score for the one or more bounding boxes. These bounding boxes may include one or more lines of text.

Second, the one or more bounding boxes may then be processed using known character by character recognition approaches such as OCR techniques to generate OCR labels for the bounding box as well as a confidence in the outputted text. Finally, the images and the labels then be analyzed to identify images that contain one or more phrases from the selected phrase list. Those images may also be labeled with the identification of the one or more phrases and a confidence score for the identification of the one or more phrases.

Images that are identified to contain one or more phrases from the selected phrase list, as well as their labels, may be included in the training images. In this regard, each such image may be labeled with one or more bounding boxes, a confidence score for each of the one or more bounding boxes, one or more phrases of the selected phrase list, and a confidence score for each of the one or more phrases. Such confidence scores may be in any range or scale, such as 0 to 1 where 1 would be a high confidence and 0 would be a low confidence or 0% to 100% where 100% would be a high confidence and 0 a low confidence. In addition, one or more images from the initial plurality of images that do not include any phrase from the selected phrase list may also be included in the training image set.

The labeled training images may then be used to train a phrase recognition model that, in response to receiving an input image, will output a prediction indicating whether a phrase of the plurality of phrases is included in the input image as well as one or more confidence scores for that indication. The model may be configured to do so without a character by character recognition analysis of the input image. In order to do so, any of a number of different types of machine learning models may be used, for example, a classification model, a neural network, a decision tree, a boosting tree, etc.

For instance, in the case of a neural network, the training may be performed using the neural network subsystem 272. In this regard, the neural network subsystem can include software that can implement the operations of each layer of the neural networks that are designed to make object predictions and determine object properties from input sensor data. The training neural network subsystem includes a plurality of computing devices having software or hardware modules that implement the respective operations of each layer of the one or more neural networks according to the architecture of the neural networks.

The training neural network subsystem 272 can include the operations of each layer of the neural networks using current parameter values stored in a collection of model parameter values. Although illustrated as being logically separated, the model parameter values and the software or hardware modules performing the operations may actually be located on the same computing device or on the same memory device.

The training neural network subsystem 272 can receive the training image set as well as any labels as input. As noted above, the phrase recognition model may also consider contextual information, such as nearby shapes, colors, edges and other features in the images as signals to indicate where the text of the selected phrase list is likely to appear relative to other such features. In addition, in order to generate a phrase recognition model that takes into account contextual information, the images in the training image set may be entire images as opposed to cropping the images to include only text with some minimal boundary area.

The training neural network subsystem 272 may generate, for each image of the training image set, one or more phrase predictions, where each phrase prediction identifies a phrase of the selected phrase list as well as the location and orientation of that phrase in the image. For instance, orientation may indicate whether a sign is upside-down or rightside up (such as someone who is directing traffic holding a temporary stop sign). A training engine analyzes the object predictions and compares the object predictions to the labels in the training image set. If the two differ, an error is indicated. The training engine then generates updated model parameter values by using an appropriate updating technique. For example, the model parameters might be updated by calculating the gradient of the error with respect to an individual model parameter. To decrease the error contribution, a value derived from the gradient can be subtracted from or added to the current value of the parameter. This is known as stochastic gradient descent with backpropagation. Other techniques known in the art can also be used to update the model parameters. The training engine can then update the collection of model parameter values using the updated model parameter values. After training is complete, the training system may provide a final set of model parameter values for the model and store this information in the storage system 250 as models 258 and a set of model parameter values 270.

Again, using the final set of model parameter values, the resulting phrase recognition model may be configured to input an image and output a prediction indicating which, if any, of the phrases of the selected phrase list as well as one or more confidence scores for that indication. For example, a first confidence score may indicate a likelihood that the image contains any text, and a second confidence score may indicate a likelihood that the image contains a particular phrase of the selected phrase list. Alternatively, the resulting model may be configured to output a confidence score for each phrase of the selected phrase list, indicating likelihoods as to whether each of the phrases of the selected phrase list is contained in the image. As another example, the output data may be a bounding box identifying where text in the image is detected, and for each bounding box, a confidence score for each phrase of the selected phrase list identified within that bounding box based on how likely it is that that phrase occurs in the bounding box.

Figure 5:
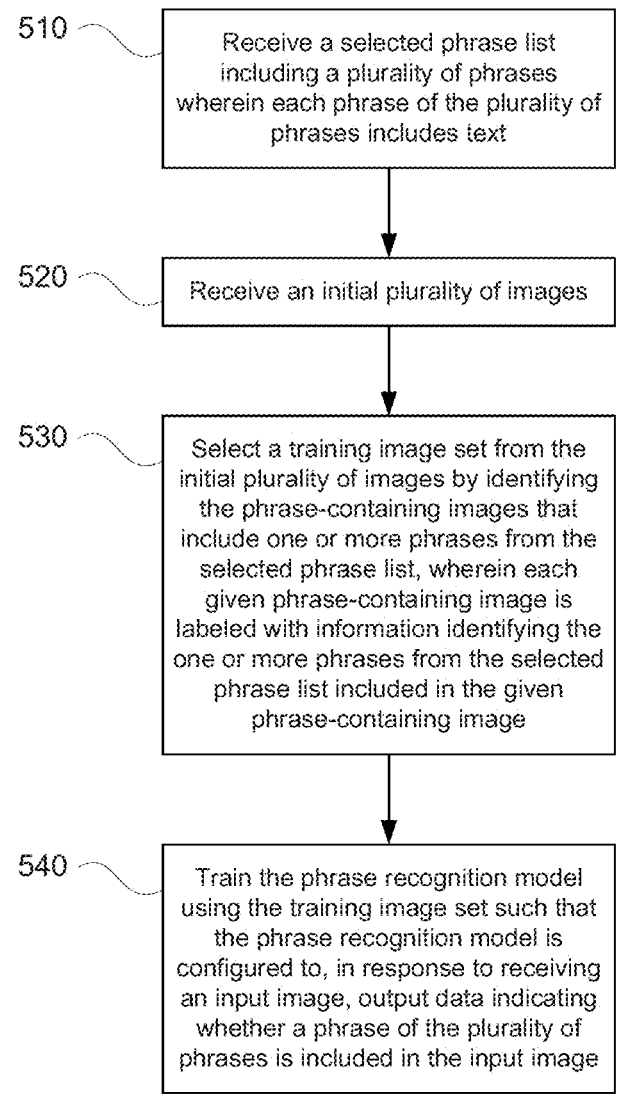
FIG. 5 is an example flow diagram in accordance with aspects of the disclosure.

FIG. 5 is an example flow diagram 500 in accordance with aspects of the disclosure which may be performed by one or more processors of one or more computing devices, such as the processors of server computing devices 210, in order to train a phrase recognition model for identifying phrases in images. In this example, a selected phrase list is received at block 510. The selected phrase list includes a plurality of phrases wherein each phrase of the plurality of phrases includes text. At block 520, an initial plurality of images is received. A training image set is selected from the initial plurality of images by identifying the phrase-containing images that include one or more phrases from the selected phrase list at block 530. Each given phrase-containing image is labeled with information identifying the one or more phrases from the selected phrase list included in the given phrase-containing image. The phrase recognition model is then trained using the training image set at block 540. This phrase recognition model is configured such that, in response to receiving an input image, output data indicating whether a phrase of the plurality of phrases is included in the input image.

The phrase recognition model, the final set of model parameter values, as well as information identifying relationships between the items of the phrase list and the semantic meanings may be sent to the computing devices 110 of vehicle 100, for instance via network 260 or otherwise loading this information into the computing devices 110. This information may then be stored in the memory 130 of the computing devices 110 in order to allow the computing devices to use the phrase recognition model to make driving decisions for the vehicle 100.

Figure 6:
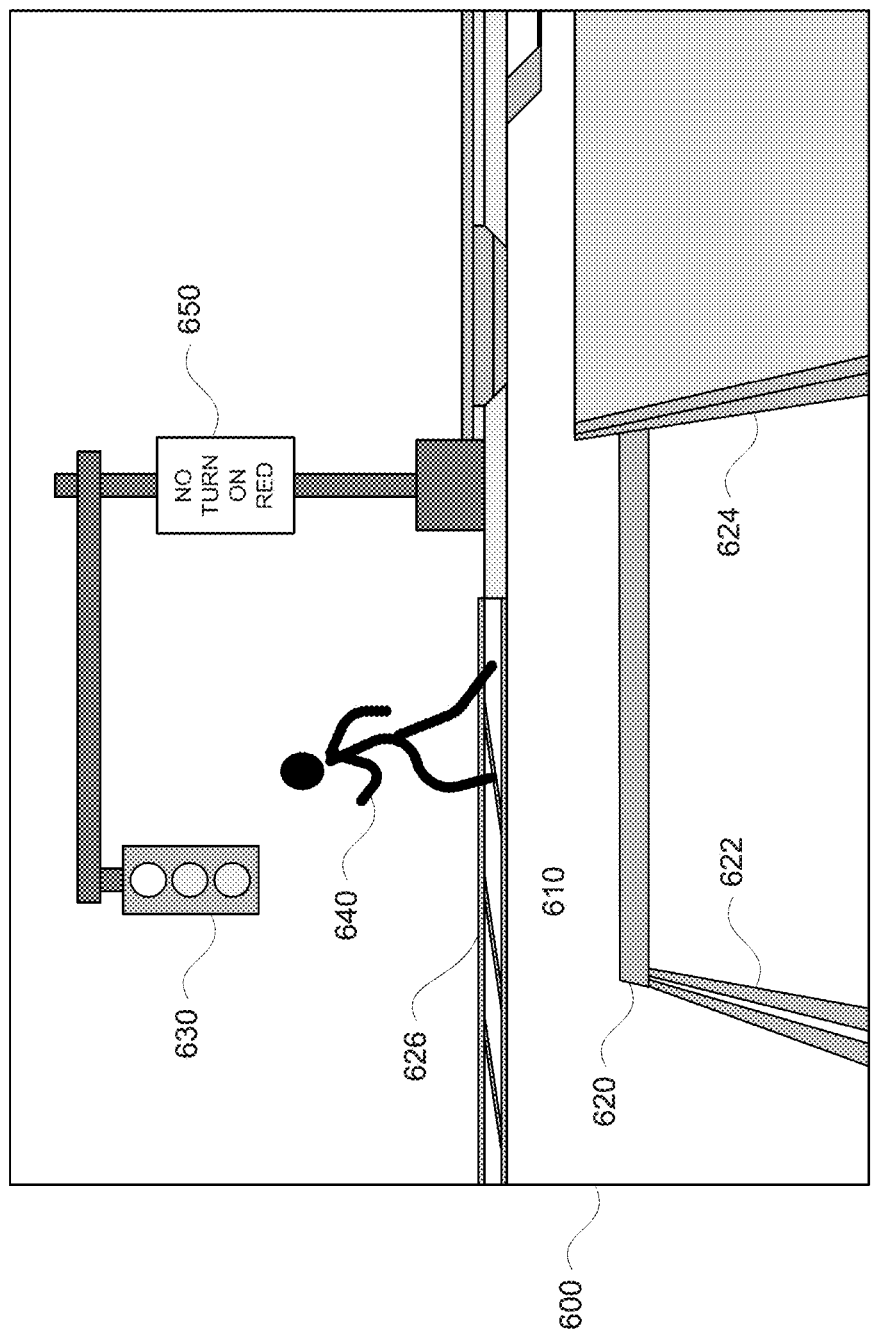
FIG. 6 is an example image in accordance with aspects of the disclosure.

For instance, the one or more computing devices 110 may receive an image of the vehicle's external environment from the vehicle's perception system. This image may or may not include text. For example, a camera of the perception system 172 of vehicle 100 may capture an image such as image 600 of FIG. 6 and send this image to the computing devices 110 for processing. In this example, the vehicle 100 is approaching an intersection 610. The image 600 includes various features in and around the intersection such as road features corresponding to a stop line 620, lane lines 622, curb 624, and a cross walk 626 as well as a traffic signal light 630, a pedestrian 640 (currently crossing intersection 610 in crosswalk 626) and sign 650. While each of these features may be readily detected using the LIDAR sensor and cameras of perception system 172, additional processing may be needed to determine the semantic meanings of the text of the sign 650.

Figure 7:
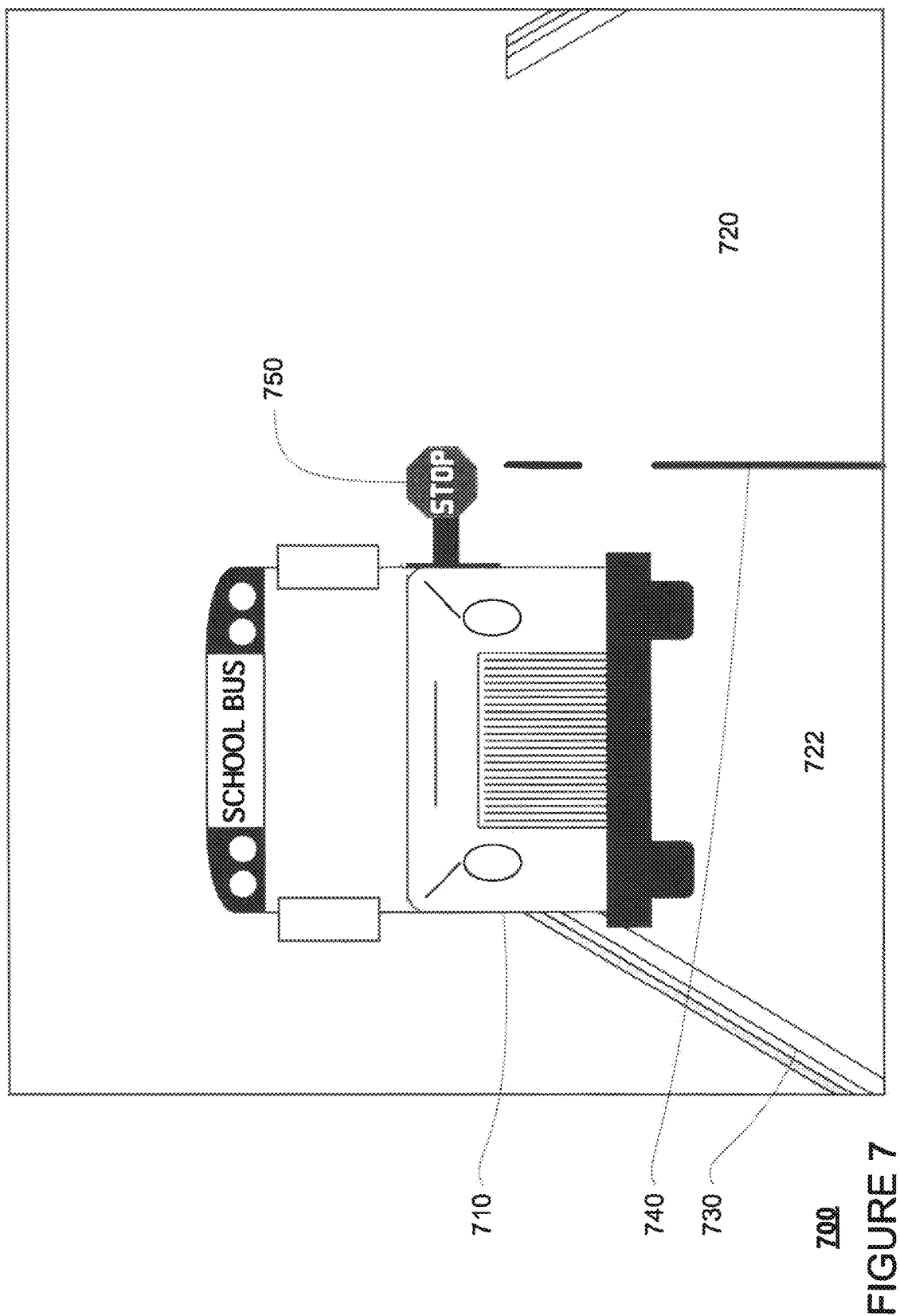
FIG. 7 is an example image in accordance with aspects of the disclosure.

As another example, a camera of the perception system 172 of vehicle 100 may capture an image such as image 700 of FIG. 7 and send this image to the computing devices 110 for processing. In this example, the vehicle 100 is driving in lane 720 and approaching a vehicle 710 (here, a school bus) stopped in lane 722. The image 700 includes various features in and around the intersection such as road features corresponding to curb 730, lane lines 740, and a sign 750. Again, while each of these features may be readily detected using the LIDAR sensor and cameras of perception system 172, additional processing may be needed to determine the semantic meanings of the text of the vehicle 710 and sign 750.

The image may then be processed by the one or more computing devices 110 using the phrase recognition model in order to identify any text in the image that is included in a selected phrase list. For example, the computing devices 110 may use the image 600 as input into the phrase recognition model which processes the image. The phrase recognition model may then provide output data that includes a prediction indicating that an image includes a bounding box with a particular confidence score as well as one or more phrases of the selected phrase list within that bounding box, each with a particular confidence score. Again, this processing of the image using the phrase recognition model is performed without a character by character recognition analysis of the input image.

As one example, the phrase recognition model may output data indicating that a specific phrase is included in an image with a particular confidence score, such as a phrase "stop here" being included in the image with a 90% confidence score. Alternatively, the phrase recognition model may provide output data including a list of one or more entries, each entry corresponding to a phrase of the selected phrase list and identifying a confidence score of that phrase being included in the image.

Figure 8:
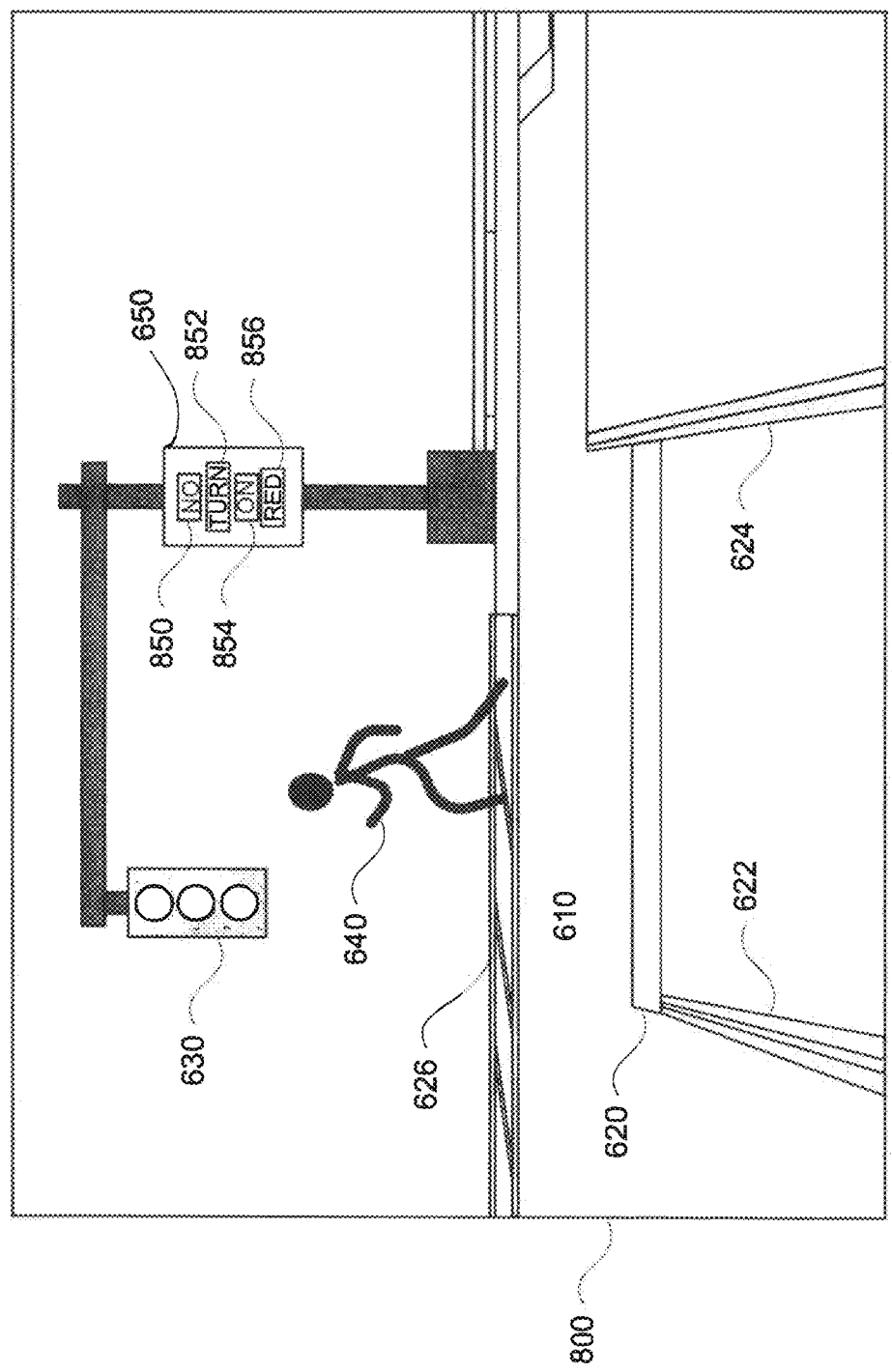
FIG. 8 is an example processed image in accordance with aspects of the disclosure.
Figure 9:
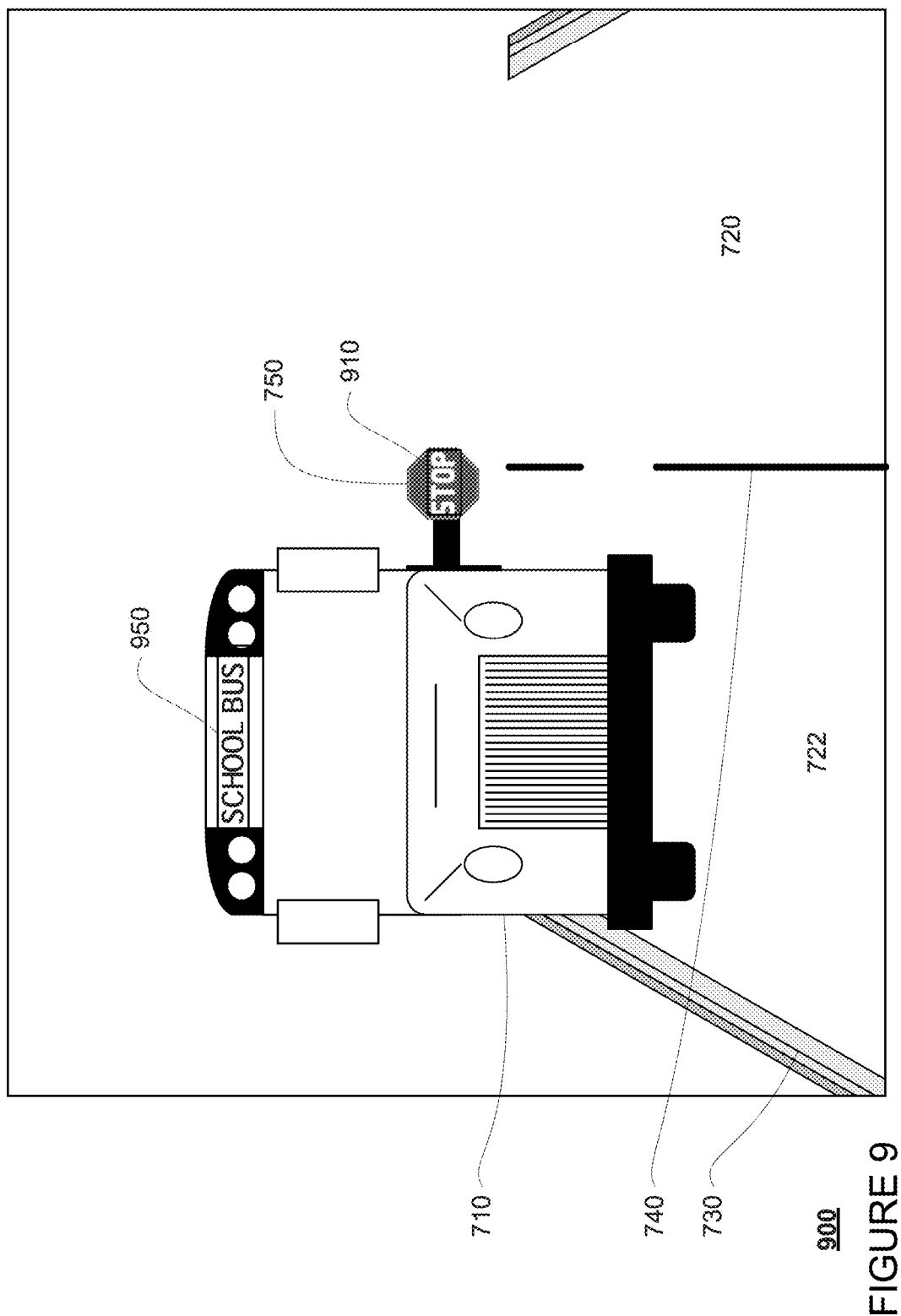
FIG. 9 is an example processed image in accordance with aspects of the disclosure.

As another example, the output data may be a bounding box identifying where text in the image is detected, and for each bounding box, a confidence score for each phrase of the selected phrase list corresponding to how likely it is that that phrase occurs in the bounding box. FIG. 8 provides a processed image 800 corresponding to image 600. In this example, sign 650 includes bounding boxes 850, 852, 854 and 856, respectively. Bounding boxes 850, 852, 856 may each be associated with one or more of the phrases of the selected phrase list and a confidence of those phrase or phrases appearing in the bounding boxes. As a simplified example, bounding box 850 list may be associated with the phrase: "no" with 97% confidence, bounding box 852 may be associated with the phrase with 98% confidence score, and bounding box 856 may be associated with the phrase "red" with 98% confidence score. FIG. 9 provides a processed image 900 corresponding to image 700. In this example, vehicle 710 includes a bounding box 950, and sign 750 includes a bounding box 910. Bounding boxes 950 and 910 may each be associated with one or more of a list of the phrases of the selected phrase list and a confidence of those phrase or phrases appearing in the bounding boxes. As a simplified example, bounding box 950 may be associated with the phrase "school bus" with 98% confidence score, and bounding box 910 may be associated with the phrase "stop" with a 97% confidence score.

These confidence scores may then be compared to a threshold value to determine whether the vehicle should respond to the semantic meaning or meanings of any identified phrases of the selected phrase list. If a confidence score meets or is greater than a threshold value, the computing devices 110 may identify the semantic meaning from the information identifying relationships between the items of the phrase list and the semantic meanings. As an example, a threshold value could be 75%, 80%, 85% or more or less. In some instances, the thresholds may be different for different phrases. These thresholds may be optimized using a precision-recall curve (i.e. based on whether higher recall or higher precision is preferred).

The computing devices 110 may ignore any identified phrase or phrases that do not meet or are below the threshold value. In other words, the phrase recognition model need not be able to recognize phrases other than those that are on the preselected phrase list. As such, a phrase which is not on the preselected phrase list would be "unrecognized" as it would not meet the threshold value for any phrase of the preselected phrase list. In such cases, the vehicle may simply ignore the unrecognized phrase, or rather, not take any further analyzing action, such as using OCR techniques, relying upon the unrecognized phrase when making a driving decision, etc.

Returning to the "stop here" example, above, the 90% confidence score is greater than the 80% threshold value. Thus, the computing devices 110 would identify the semantic meaning for the phrase "stop here" from the information identifying relationships between the items of the phrase list and the semantic meanings stored locally in the memory 130. Returning to the example of FIG. 8, above, the 97 and 98% confidence scores greater than the 80% threshold value. Thus, the computing devices 110 would identify the semantic meaning for the phrases "no" "turn" "red" from the information identifying relationships between the items of the phrase list and the semantic meanings stored locally in the memory 130. Returning to the example of FIG. 9, above, the 98 and 97% confidence scores greater than the 80% threshold value. Thus, the computing devices 110 would identify the semantic meaning for the phrases "school bus" and "stop" from the information identifying relationships between the items of the phrase list and the semantic meanings stored locally in the memory 130.

The computing devices 110 may then control the vehicle 100 in the autonomous driving mode based on whether the image included a phrase of the selected phrase list and in accordance with the identified semantic meaning for that phrase. For instance, if the vehicle is to react to the semantic meaning for "stop here", the computing devices may stop the vehicle proximate to the location of the text before proceeding.

The semantic meanings of these phrases may also be combined or considered together, for instance, in the context of a larger scene. For instance, understanding a scene may include grouping all phrases meeting the threshold of all bounding boxes within a single sign or within some small distance, such as a several inches or more or less, from one another. As such "no" "turn" and "red" may be grouped together. In one example, the semantic meaning of the each of the individual phrases within a group may be identified from the information identifying relationships between the items of the phrase list and the semantic meanings stored locally in the memory 130. For instance, the semantic meanings for each of "no" "turn" and "red" would be identified individually. Thereafter the semantic means of the group may be considered together. In addition or alternatively, the semantic meaning of the combination of phrases may be identified from the information identifying relationships between the items of the phrase list and the semantic meanings stored locally in the memory 130. In this instance, the semantic meanings for each of "no" "turn" and "red" would be identified together. In this regard, there may be a single semantic meaning in the information identifying semantic meaning for a group including phrases "no" "turn" and "red". In addition or alternatively, the individual semantic means of each phrase. Referring to the example of FIG. 8, despite the fact that the pedestrian is not preventing the vehicle from making a right turn when traffic signal light 630 is red, the computing devices 110 may wait until the traffic signal light 630 is green before making a right turn at intersection 610 given the semantic meaning or meanings of "no" "turn" and "red".

The phrase recognition model may allow the computing devices 110 to make such driving decisions for the vehicle 100 on the order of tens of milliseconds as opposed to several seconds using an optical character recognition technique for all identified text. This may thus allow the computing devices to make driving decisions based on such determinations in real time. In addition, the phrase recognition model may be able to be implemented in order to process images captured by multiple cameras located at different positions on the vehicle which can provide the computing devices 110 with more accurate information about the vehicle's surrounding environment.

The phrase recognition model may be used to validate or augment one or more additional image recognition models. For example, the phrase recognition model may be used by the computing devices 110 to determine whether an image includes a particular phrase from the selected phrase list. A pattern recognition model may be used by the computing devices 110 to determine whether the same image contains one or more particular patterns, and if so, whether those particular patterns are associated with a semantic meaning. Examples of particular patterns may include geometric patterns, shapes, colors, particular graphics, for instance arrows or figures, etc.

For instance, turning to image 700 of FIG. 7, using the pattern recognition model, the computing devices 110 may determine that an image contains a red octagon (or in other words, the shape of a stop sign), which is associated with having a semantic meaning of controlling the vehicle in order to stop, or that image 70 contains a yellow bus (i.e. a school bus), which is associated with having a semantic meaning of always yielding to the bus. The semantic meaning of the particular pattern detected using the pattern recognition model may be compared with the semantic meaning of the particular phrase detected using the phrase recognition model. If the two meanings match (for instance, the semantic meanings for the text "stop" and red octagon or the semantic meanings for the text "school bus" and yellow bus), then the pattern recognition model may be validated by the phrase recognition model. When the two meanings do not match (for instance, for "go" and red octagon), then the image can be mined for further labeling or training efforts. Alternatively, the pattern recognition model may be used to validate the phrase recognition model in a similar way.

As another example, the pattern recognition model may be used by the computing devices 110 to determine that there is an open lane to the left of the vehicle and that there is no open lane to the right of the vehicle. The phrase recognition model may be used by the computing devices 110 to determine that the phrase "lane closed" is in an image. Because the semantic meaning of "lane closed" matches the semantic meaning of "no open lane", the results of the pattern recognition model may be validated. The computing devices 110 may therefore decide to control the vehicle in order to change to the lane to the left or otherwise avoid the lane to the right.

In addition, a location and orientation of the particular phrase on the image may be determined by the computing devices 110 using the phrase recognition model, and a location of the particular pattern on the image may be independently determined by the computing devices 110 using the pattern recognition model. This way, the semantic meanings may be compared only if the locations of the particular phrase and the particular pattern overlap. For example, if the particular phrase, for instance "stop," is located at or near, for instance inside or immediately outside of the red octagon, then the semantic meanings can be compared to validate the pattern recognition model. However, if the particular phrase ("stop") is located at an opposite corner of the image as the particular pattern (red octagon), then the semantic meanings are not compared. Again, alternatively, the pattern recognition model may be used to validate the phrase recognition model in a similar way.

Additionally, when the two semantic meanings match, the computing devices 110 may have two independent determinations that a particular road condition or rule is detected, and can therefore make decisions based on these determinations with higher confidence than using either model alone. When the two meanings do not match, then the computing devices 110 may flag the image for further processing. This may include flagging the image for immediate or later review (for instance by a human operator), flagging for intervention by a driver or passenger of the vehicle if necessary, flagging to label the image for use as a new training image, and/or flagging to further analyze the image using a character-by-character optical recognition technique. If the image is flagged for immediate review, the image may be automatically sent in a request for assistance to a remote computing device, such as concierge work station 240, for review by human operator, such as concierge 242, who may respond by provided instructions to the computing devices 110 as to whether and how to respond to a sign or other object in the image. The computing devices 110 may then use the instructions to control the vehicle. This may allow for an added layer of safety.

Additionally, the vehicle's computing devices may be configured to flag an image for further processing when the confidence score that the image contains the particular phrase is below a first threshold value (for instance 80% or more or less) and above a second threshold value (for instance 30% or more or less). For example, if the confidence score that the image contains "stop" is 50%, there is both a substantial likelihood that there is a stop sign (because confidence score is above 30%), and a substantial doubt that the sign is not a stop sign (because confidence score is below 80%). Thus, the vehicle's computing device may use the character recognition model to determine whether the characters at the location of the particular phrase are "s-t-o-p". Additionally, as discussed above, further processing may also include flagging the image for immediate or later review, flagging for intervention by a driver or passenger of the vehicle if necessary, flagging to label the image for use as a new training image, and/or flagging to further analyze the image using a character-by-character optical recognition technique.

The character recognition model may also be used to augment the phrase recognition model. For instance, a vehicle's computing devices may determine based on the phrase recognition model that the particular phrase is part of an unrecognized phrase, and then uses a character recognition model to determine the rest of the unrecognized phrase. For example, the computing devices 110 may determine based on the phrase recognition model that the image contains the phrase "U turn," and may further determine based on the phrase recognition model that the image contains additional text next to "U turn." The computing devices 110 may then use the character recognition model to determine that the rest of the unrecognized phrase says "No" and "7 am-10 am Mon.-Fri." Thus, by using two independent image recognition models, the content of an entire sign may be determined by the computing devices 110 to be "No U turn 7 am-10 am Mon.-Fri." Assuming that the computing devices are able to look up the semantic meaning of this phrase, since the more computationally intensive character recognition model is only used to determine the characters next to the particular phrase (instead of the entire image), this process may still allow the vehicle to make timely driving decisions.

The phrase recognition model may also be used in other ways. For instance, the phrase recognition model may be used to analyze and create labels in images offline in order to improve the training image set, to help in a labeling pipeline for generating labels in images, or to help operators generating map data for the autonomous vehicles, by creating label suggestions for the operators. In another example, the phrase recognition model bounding boxes and text may be used to determine the orientation of a sign, such as a temporary stop sign which may also assist labeling efforts.

In addition to a selected phrase list, the phrase recognition model may also be trained as a single character recognition model to recognize individual letters. For instance, the phrase recognition model may be trained using images labeled with individual letters or numbers (a through z, 0 through 9, etc.) so that the phrase recognition model will also predict the likelihood or confidence score of individual characters being present inside a bounding box. This type of character recognition may not necessarily identify where the individual characters are located inside the bounding box or in what order, which is what a standard OCR model does much more slowly. For example, if a bounding box contained the word STOP or POTS, the output of the confidence scores for the individual characters will be identical. Of course, the phrase prediction model may still distinguish STOP from POTS, the additional individual character analysis may be useful to identify phrases outside the selected phrase list. As another example, if there is a stop sign, such as a typical red and white octagon, with the text "Stop for hamburgers", detecting a high probability of individual characters in addition to "stop", from the selected phrase list, present in the bounding box is useful to determining whether or not the vehicle should respond to the stop sign.

Figure 10:
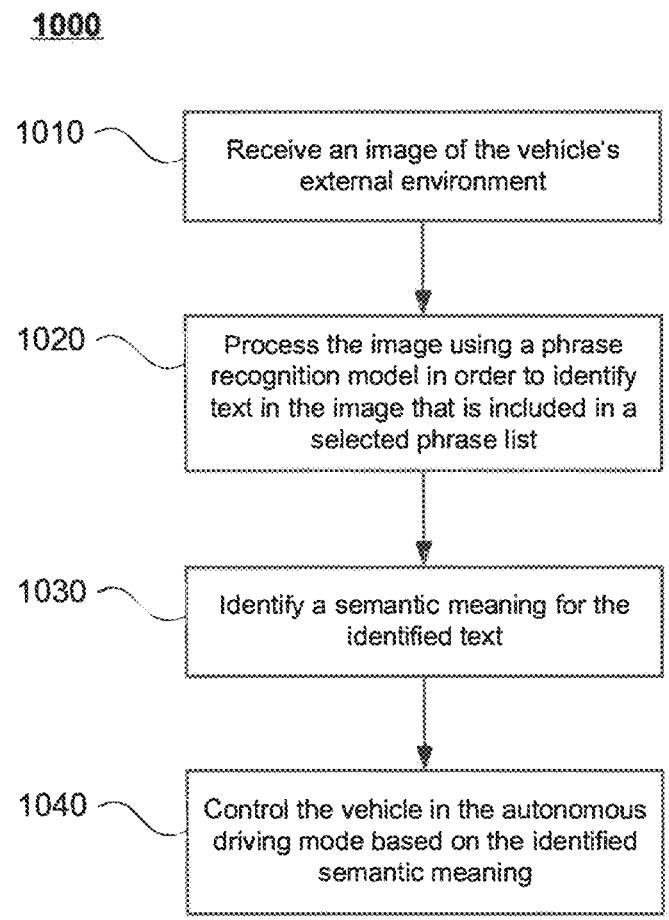
FIG. 10 is an example flow diagram in accordance with aspects of the disclosure.

FIG. 10 is an example flow diagram 1000 in accordance with aspects of the disclosure which may be performed by one or more processors of one or more computing devices, such as processors 120 of computing devices 110, in order to control the vehicle in the autonomous driving mode. At block 1010, an image of the vehicle's external environment is received. The image is processed using a phrase recognition model in order to identify text in the image that is included in a selected phrase list at block 1020. A semantic meaning for the identified text is identified at block 1030. The vehicle is then controlled in the autonomous driving mode based on the identified semantic meaning at block 1040.

Again, the features described above may provide for an efficient onboard phrase recognition model. First, training the phrase recognition model offline and loading the model onto the vehicle makes it possible to use a very large number of training images to achieve a model with desired high accuracy faster than if done on the vehicle. Second, the phrase recognition model, which detects an entire phrase, which could include one or more words or numbers, is more efficient than a character-by-character analysis. These features therefore reduce the required processing power of onboard computing devices, which may reduce the overall cost of the vehicle and energy consumption while at the same time enabling faster detection of road conditions and rules, for example on the scale of milliseconds, which also improve the overall safety of the vehicle. The technology further provides for use of the phrase recognition model in conjunction with other onboard image recognition models, such as a pattern recognition model or a character recognition model, which may further provide confirmation of determinations, additional information, as well as improved safety without a great sacrifice of processing time.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling an autonomous vehicle, the method comprising:
   determining, by one or more processors, a confidence score indicating how likely it is that text in one or more areas of a road sign includes one or more phrases included in a preselected phrase list;
   comparing, by the one or more processors, the confidence score to a threshold;
   identifying, by the one or more processors, a semantic meaning for the road sign based on the comparison; and
   controlling, by the one or more processors, the vehicle based on the semantic meaning.

2. The method of claim 1, wherein the text includes one or more phrases or words providing rules that the vehicle should follow when maneuvering on a roadway.

3. The method of claim 1, further comprising:
   receiving, by the one or more processors, a plurality of images captured by a perception system of the vehicle; and
   determining, by the one or more processors, the one or more areas of the road sign in one of the plurality of images.

4. The method of claim 3, further comprising:
   determining, by the one or more processors, a confidence score for each of a plurality of individual characters in the text; and
   identifying, by the one or more processors, phrases that are not included in the preselected phrase list based on the determined confidence score for each of the plurality of individual characters in the text.

5. The method of claim 3, further comprising:
   determining, by the one or more processors, a confidence score for each respective phrase of the phrase list, each respective phrase being associated with a threshold value; and
   comparing, by the one or more processors, each confidence score for each respective phrase to the threshold associated with that respective phrase, and wherein identifying the semantic meaning for the road sign is further based on the comparing of each confidence score for each respective phrase to the threshold associated with that respective phrase.

6. The method of claim 5, further comprising:
   determining, by the one or more processors, that the phrase indicates that a lane of a road is closed; and
   controlling, by the one or more processors, the vehicle to avoid the lane of the road that is closed.

7. The method of claim 3, further comprising:
   determining contextual information based on a location of the text; and
   using the determined contextual information to control the vehicle.

8. The method of claim 7, wherein the contextual information includes one or more of nearby shapes, colors, edges and other features in the images.

9. The method of claim 7, further comprising:
   determining that the text is part of an unrecognized phrase;
   determining at least part of the unrecognized phrase; and
   using the determined at least part of the unrecognized phrase to control the vehicle.

10. The method of claim 3, further comprising:
    flagging, by the one or more processors, one of the plurality of images for immediate or later review.

11. The method of claim 3, further comprising:
    flagging, by the one or more processors, one image of the plurality of images for intervention by a driver or passenger of the vehicle.

12. The method of claim 3, further comprising:
    flagging, by the one or more processors, one image of the plurality of images to label the image for use as a new training image.

13. The method of claim 3, further comprising:
    flagging, by the one or more processors, one image of the plurality of images to further analyze the one image using a character-by-character optical recognition technique.

14. A system for controlling an autonomous vehicle, the system comprising:

a storage system;

a perception system configured to capture a plurality of images; and one or more processors coupled to the storage system and the perception system, wherein the one or more processors are configured to:

determine a confidence score indicating how likely it is that text in one or more areas of a road sign includes one or more phrases included in a preselected phrase list;

comparing the confidence score to a threshold;

identify a semantic meaning of the one or more phrases when the confidence score exceeds the threshold; and control the vehicle based on the semantic meaning of the one or more phrases.

15. The system of claim 14, further comprising the vehicle.

16. The system of claim 14, wherein the one or more processors are further configured to:

receive a plurality of images captured by a perception system of the vehicle; and determine, the one or more areas of the road sign in one of the plurality of images.

17. The system of claim 16, wherein the one or more processors are further configured to flag one of the plurality of images for immediate or later review.

18. The system of claim 16, wherein the one or more processors are further configured to flag one image of the plurality of images for intervention by a driver or passenger of the vehicle.

19. The system of claim 16, wherein the one or more processors are further configured to flag one image of the plurality of images to label the image for use as a new training image.

20. The system of claim 16, wherein the one or more processors are further configured to flag one image of the plurality of images to further analyze the one image using a character-by-character optical recognition technique.

* * * * *